(12) United States Patent
Siracusano, Jr.

(10) Patent No.: US 8,881,012 B2
(45) Date of Patent: Nov. 4, 2014

(54) VIDEO STORAGE AND RETRIEVAL SYSTEM AND METHOD

(75) Inventor: Louis H. Siracusano, Jr., Montvale, NJ (US)

(73) Assignee: LHS Productions, Inc., Northvale, NJ (US)

( * ) Notice: Subject to any disclaimer, the term of this patent is extended or adjusted under 35 U.S.C. 154(b) by 670 days.

(21) Appl. No.: 12/590,941

(22) Filed: Nov. 17, 2009

(65) Prior Publication Data

US 2011/0119588 A1     May 19, 2011

(51) Int. Cl.
| | |
|---|---|
| G06F 3/00 | (2006.01) |
| G06F 3/0481 | (2013.01) |
| G06F 3/0488 | (2013.01) |
| G11B 27/034 | (2006.01) |
| G11B 27/10 | (2006.01) |
| G11B 27/34 | (2006.01) |

(52) U.S. Cl.
CPC .......... *G06F 3/0481* (2013.01); *G06F 3/04886* (2013.01); *G11B 27/034* (2013.01); *G11B 27/105* (2013.01); *G11B 27/34* (2013.01); *G06F 2203/04803* (2013.01); *G06F 2203/04806* (2013.01)
USPC ............................ 715/723; 715/720; 715/721

(58) Field of Classification Search
USPC ........................................................ 715/723
See application file for complete search history.

(56) References Cited

U.S. PATENT DOCUMENTS

| | | | | |
|---|---|---|---|---|
| 5,600,775 | A * | 2/1997 | King et al. | 715/203 |
| 6,400,996 | B1 * | 6/2002 | Hoffberg et al. | 700/83 |
| 6,452,612 | B1 * | 9/2002 | Holtz et al. | 715/723 |
| 7,647,555 | B1 * | 1/2010 | Wilcox et al. | 715/721 |
| 7,747,655 | B2 * | 6/2010 | Hull et al. | 707/802 |
| 2001/0018693 | A1 * | 8/2001 | Jain et al. | 707/500 |
| 2002/0145622 | A1 * | 10/2002 | Kauffman et al. | 345/723 |
| 2002/0163548 | A1 * | 11/2002 | Chiu et al. | 345/864 |
| 2002/0175917 | A1 * | 11/2002 | Chakravarty et al. | 345/473 |
| 2003/0009493 | A1 * | 1/2003 | Parker et al. | 707/500.1 |
| 2004/0034869 | A1 * | 2/2004 | Wallace et al. | 725/45 |
| 2005/0033758 | A1 * | 2/2005 | Baxter | 707/100 |
| 2005/0160113 | A1 * | 7/2005 | Sipusic et al. | 707/104.1 |
| 2006/0279628 | A1 * | 12/2006 | Fleming | 348/143 |
| 2008/0080743 | A1 * | 4/2008 | Schneiderman et al. | 382/118 |
| 2008/0163117 | A1 * | 7/2008 | Machtelinck et al. | 715/822 |
| 2009/0164904 | A1 * | 6/2009 | Horowitz et al. | 715/723 |
| 2011/0066646 | A1 * | 3/2011 | Danado et al. | 707/770 |

* cited by examiner

*Primary Examiner* — Stephen Alvesteffer
(74) *Attorney, Agent, or Firm* — Gregor N. Neff

(57) ABSTRACT

A video image storage and retrieval system providing computer displays of timelines for video sequences, in which a first timeline shows time divisions for segments for the longer sequences, and the other timelines each provide for locating images within the segments. Timecodes in the other timelines are aligned with those in the first timeline so that searching for images in the other timelines is facilitated.

9 Claims, 5 Drawing Sheets

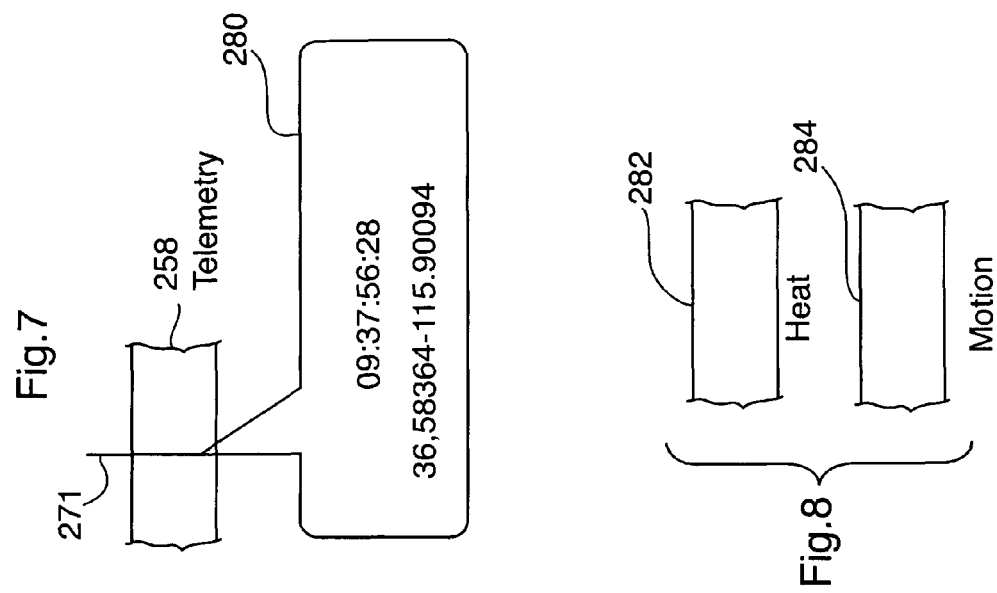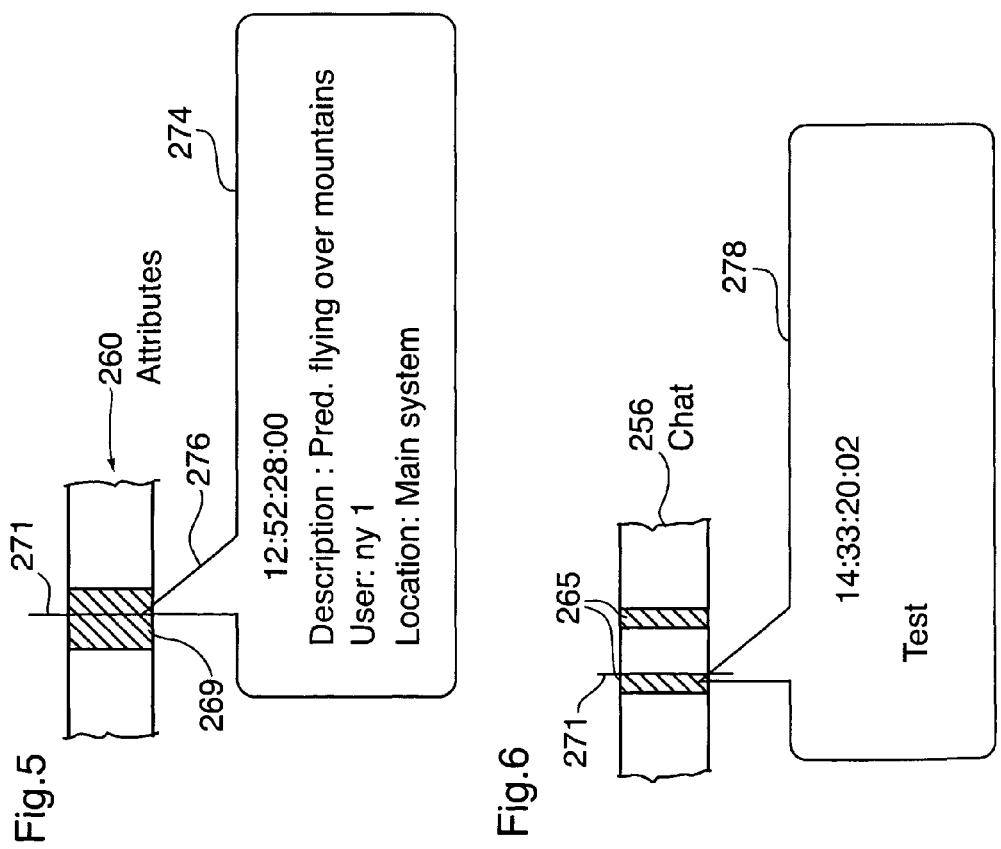

VIDEO STORAGE AND RETRIEVAL SYSTEM AND METHOD

BACKGROUND OF THE INVENTION (1) Field of the Invention

This invention relates to video storage and retrieval systems and methods.

(2) Background Art and Problems

The storage and retrieval of video images and audio files, still images and other digital files and related data presents long-standing and difficult problems, especially where the video records are of relatively long duration.

Video loggers have been provided for recording all video program materials broadcast by a given broadcast source. Such logging is done for compliance with laws, and for protection against unjustified claims made against the broadcast source, and for other valid purposes.

In some loggers, operators have applied metadata tags to the records to facilitate later location and retrieval of specific items or segments of the video record. Nonetheless, the labor and time required to retrieve specific images or segments of the recorded programs often is significant.

Some equipment sold in the past by VideoBank Inc. of Northvale, N.J., USA, the assignee of this patent application, has provided improved ability to retrieve selected video images, such as by identifying specific locations of video images having predetermined attributes, applying metadata tags to those images, and using the tags to retrieve them. Although that equipment represents a substantial step forward, further improvements are needed.

(3) Objectives of the Invention

In accordance with the foregoing, it is an object of the invention to provide a video storage and retrieval system and method which enables video images to be selected and retrieved more quickly and easily than in the past, and which permits selection on the basis of a wider variety of criteria than in the past.

BRIEF SUMMARY OF THE INVENTION

In accordance with the present invention the foregoing objectives are met by the provision of a video image storage and retrieval system including a video logger having electronic means for electronic tagging of video images to locate by timecode image features of interest, timeline display means for displaying a timeline with markings indicating the time boundaries of predetermined segments of a series of video images, and a retrieval means with a marker or cursor for alignment with the timeline and for displaying video images selected with the aid of another timeline from a segment at the location of the marker.

The invention also provides means for storing and subsequently locating and retrieving, by means of a timeline, chat stored with the video images, and to produce new video clips and images.

A further feature of the invention is the provision of multiple timelines on a single display with multiple video image streams being displayed adjacent one another.

A further feature of the invention is the provision of the means for recording, tagging and subsequently retrieval of image locations where motion and/or telemetry and/or heat is detected, thereby facilitating surveillance.

A further "filter" feature allows the location of specific types of events not previously segregated from the others.

In a further aspect, the invention comprises the provision of computer displays of timelines for video sequences, in which a first timeline shows time divisions for segments of the longer sequences, and the other timelines each provide for locating images within the segments. Timecodes in the other timeline(s) are aligned with those in the first timeline so that searching for images in the other timeline(s) is facilitated.

The foregoing and other objects and advantages of the invention will be set forth in or apparent from the following drawings and description.

BRIEF DESCRIPTION OF THE DRAWINGS

FIGS. 5, 6 and 7 are samples of data displays produced for various images selected and reproduced on the display screen of FIG. 4; and FIG. 8 is a schematic diagram showing additional timelines which can be displayed on the screen of FIG. 4.

DETAILED DESCRIPTION OF THE INVENTION

Overall System

Figure 1:
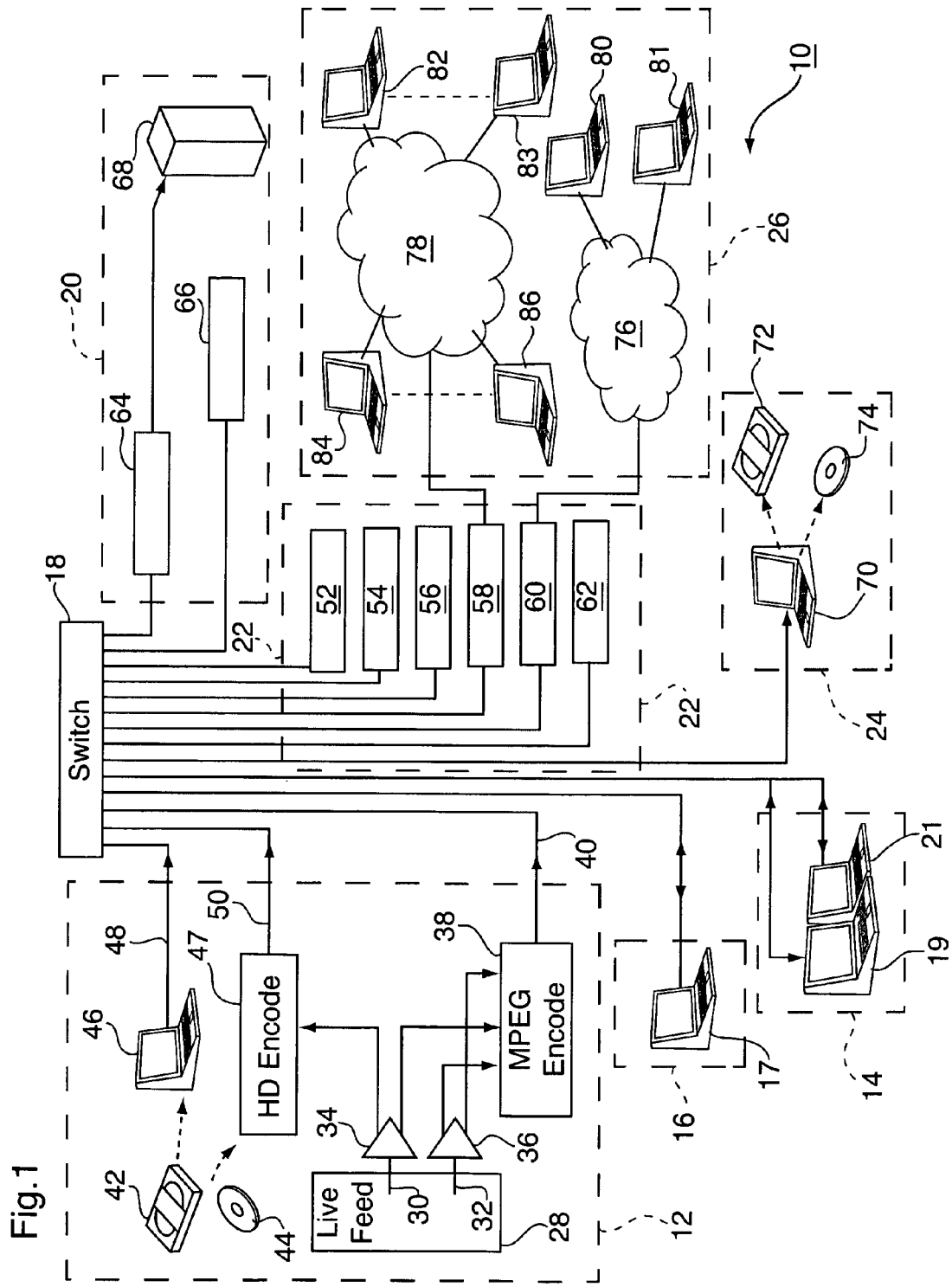
FIG. 1 is a schematic diagram of a system comprising and utilizing the invention.

FIG. 1 is a schematic diagram showing the storage and retrieval system 10 of the present invention.

System 10 includes an encoding section 12, a logger section 14, an administrative control section 16, a local area network switch 18, a storage and control section 20, a server section 22, a production section 24, and a web access section 26.

In general operation, the system 10 receives video signals from live feeds or archival storage media such as videotapes or discs. Those signals are encoded and stored in one of a number of servers in the server section 22. The signals are tagged by use of logger equipment including a workstation 21. The signals are retrieved and displayed, together with timelines, at any of several workstations in the system. Selected images are used live, or after storage or reproduced on DVDs or other media with the use of a workstation 70 in the production unit 24. Alternatively, or in addition, personnel located at remote locations can use all or part of the system under license through an internet connection, as indicated in the web access section 26.

Encoding

Multiple live video feeds are delivered from a source 28. For example, six or more live feeds can be accommodated. Two such live feeds 30 and 32 are shown in the drawing.

Each live feed is delivered to an output amplifier 34 or 36 which divides the signals so as to supply them on two output lines leading to an MPEG encoding unit 38, and/or to a HD encoding unit 47, and ensures the timecodes of the signals are in sync. The unit 38 contains two encoder cards for each live feed. One card is a MPEG 1 encoder, and the other is a MPEG 2 encoder. Thus, both MPEG 1 and MPEG 2 encoding, or MPEG 1 and HD encoding are provided for each live feed.

The encoded output signals from the unit 38 are delivered through the switch 18 to a server 62 where they are stored.

Archival video records, such as those stored on DVDs 42 or CDs 44 are encoded in workstation 46 or by an HD encoder 47. As noted above, live HD video also is encoded by encoder 47. Encoded signals are sent over lines 48 or 50 through the switch 18 to the server 62.

Data associated with the video signals is stored in a data core server 54. Storage is controlled by Microsoft SQL or Oracle software for database management.

Advantageously, the MPEG 1 encoded signals are used in the workstations and elsewhere to manipulate the signals, but the corresponding MPEG 2 or HD signals are used in producing the end product. Thus, in manipulating the signals, the speed and the cost of the equipment are optimized, whereas the signals finally recorded have the highest quality.

Administrative Control

The administrative control workstation 17 is programmed to apply a unique identifier code to each separate unit of live video or archival video received. For example, each such unit typically will be identified with a recording number, a recording date, and other information unique to that unit.

In addition, the workstation 17 is adapted to do the following:

a. Create new user groups and configure multiple workflows using the network 10.

b. Customize metadata categories and descriptors.

c. Set permissions (passwords, etc.) for individual users and groups to use the system.

d. Reconfigure system preferences.

e. Schedule automated encoding, transcoding and distribution of stored images and data.

f. Generate system reports.

Optionally, the workstation 17 can be used to display and select video images using the timelines to be discussed below, thus operating to select and retrieve video images which are to be retrieved.

Storage Control

The storage control portion 20 of the network 10 includes a hierarchical storage manager unit 64, which selectively delivers older data and video to a tape library 68 for long-term limited-access storage. The older signals and information are downloaded periodically, when necessary.

If desired, long term storage can be provided on other server devices not shown. For example, Blu-ray DVDs or other devices which may exist or be developed in the future can be used for long-term signal storage.

An optional storage control unit 66 is provided for use in storing information in other servers not shown in FIG. 1, if desired or needed.

Storage

Some of the servers in the server unit 22 already have been described, at least in part.

Server 52 is a migration management server which is programmed to manage the movement of files in the system.

Server 58 is an application server for facilitating web communications with an interne power user group, represented by the cloud 78 and workstations 82, 83, 84 and 86. These workstations enable the storage and retrieval system functions remotely through the world wide web. These users typically are given a license to do so.

Another server 60 is an application server to enable web communication with another group network indicated at 76 and including multiple workstations such as the stations 81 and 82.

Some of the latter workstations are given a license only to view the feeds provided by the system. Other workstations are enabled to manipulate the images and data to a certain extent but do not have the full control of the power users group.

Production

The production section of the network 10 includes a workstation 70 and exemplary DVD 72 and CD 74 which are symbolic of the record media that the selected video signals are recorded on for transportation and use elsewhere. The workstation 70 controls the preparation of the output media, and performs other functions such as playlist production, etc.

If desired, the timelines for the video can be displayed at the workstation 70 instead of, or in addition to the workstation 19 in order to use the beneficial timeline and other selection features of the invention.

Logger

The logger 21 is in communication with the core server unit 54 which stores the data (timecodes, metadata, etc.) for the incoming video.

The detailed functions of the logger 21 will be explained below. However, in general, the logger 21 is used to display the streams of video being received and apply metatags and attributes and store the data so developed in the core server 54.

The logger 21 receives an encoded video signal so as to enable the unit to display the live video coming in to the system for use in metatagging and other functions.

Figure 2:
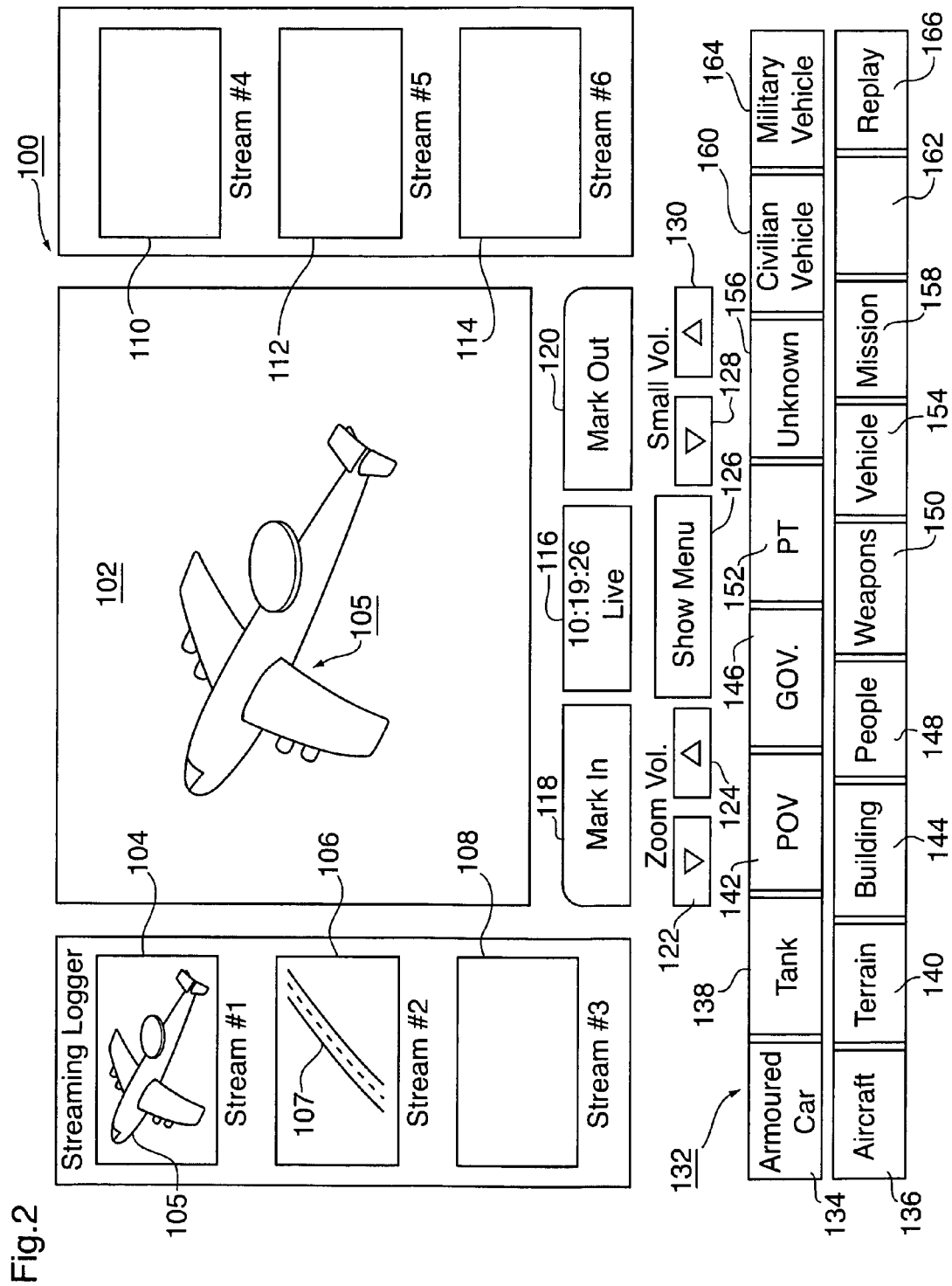
FIGS. 2 and 3 are schematic representations of typical display screens used in the logger unit of the present invention.

FIG. 2 is a partially schematic view showing a typical screen display 100 for the logger. The screen display preferably is a touch-screen with a centrally located large picture display area 102, and six smaller video displays for displaying up to six different streams of video signals. These displays are numbered 104, 106, 108, 110, 112 and 114. Images are shown in only two of the displays, numbers 104 and 106. In this case, screen 104 displays an image 105 of a military aircraft, and screen 106 displays a road 107 in a ground area under surveillance. Preferably, the large central display area 102 displays an enlargement of the same image 105 as in one of the six video streams.

A time display 116 displays the timecode at that instant, and of course, is constantly changing while video streams are being received. Control push buttons (actually, touchpads) 118 and 120 are provided for tagging images of interest which are being displayed on the large center screen 102. Button 118 can be used to mark the start of a desired sequence, and the pad button 120 is used to mark the end of the sequence.

The "LIVE" indication on push button area 116 indicates that the sources for the various streams being viewed are live as opposed to recorded.

Various other controls, such as a zoom volume control 122 and a sound volume control 124 for the large center screen 102 are provided, and a zoom control 128 and volume control 130 are provided for the smaller images. A "SHOW MENU" button 126 can be used to display on the screen 102 a menu of the available stream display screens.

A customized, virtual keypad 132 is provided at the bottom margins of the screen area shown in FIG. 2. The virtual keys in the keypad 132 are designed by the operator of the system according to one of several available profiles to indicate specific attributes to be looked for in the video streams, and then to use those keys to form metadata tags. Those tags can be used in searching for corresponding images. For example, virtual key 134 is labeled "ARMORED CAR." Similarly, pad 138 is labeled "TANK." These terms are used to identify war vehicles. Other keys like 160 and 164 are used to indicate civilian vehicles and military vehicles, respectively.

In the bottom row, key 136 is used to identify "AIRCRAFT"; key 140 indicates "TERRAIN"; key 144 indicates "BUILDING" etc. Keys 142, 146, 152 and 156 indicate, respectively, "POV"; "GOV"; "PT" and "UNKNOWN." Similarly, keys 148, 150, 154 and 158 indicate "PEOPLE"; "WEAPONS"; "VEHICLES" and "MISSION," respectively. Keys 162 is blank but can be used to indicate another attribute of the video streams to be searched for. Key 166 is used to effect a replay of video signals previously played.

The replay key can be used to replay images and apply tags to images in which the application of metatags was missed.

In accordance with one advantageous feature of the invention, the server 62 which receives the encoded video signals is programmed to develop a timeline marking signal automatically and store it whenever a predetermined time elapses from the previous such mark. These timeline signals are stored in the memory 56 for later use in a manner to be described below. For example, the signal can be developed once every ten minutes, or once every hour, or at other time intervals, as desired. As it will be explained below, these uniform time signals are used in a manner so as to divide a lengthy recording into much shorter time segments, preferably uniform in time duration, so as to facilitate searching for the video signals desired.

Figure 3:
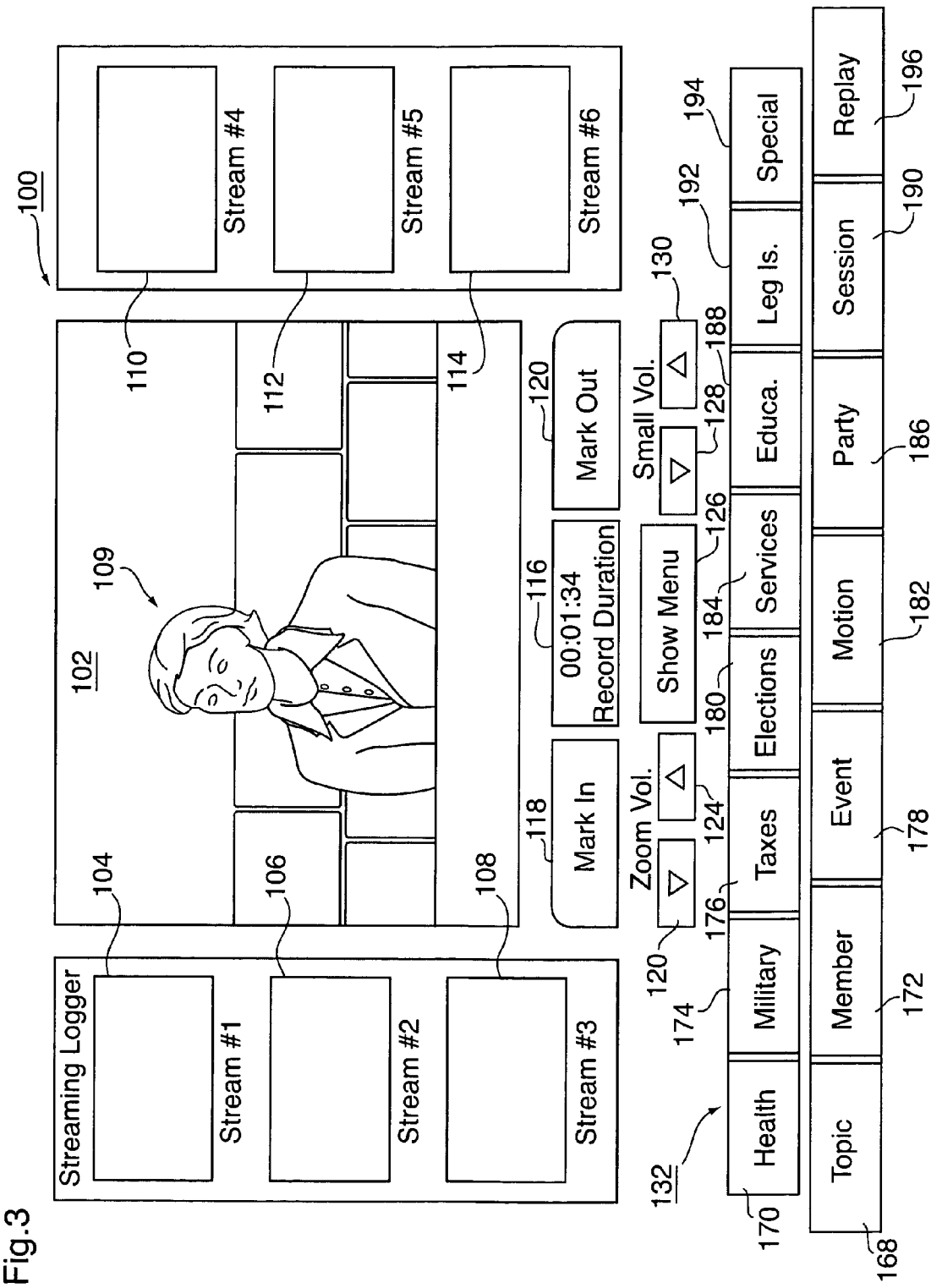

FIG. 3 is a view of the screen 100 shown in FIG. 2 except adapted to review and analyze video images in a different category or "profile." The logger can be programmed to perform the logging functions with respect to video images of virtually any desired topic, such as baseball, football, military operations, automobile racing, etc.

The particular topic illustrated in the screen 102 indicates schematically a person 109 speaking at a legislative hearing, and therefore, the subject matter of the keys of the keypad 132 are directed towards that subject. In this case, the virtual keypad is quite different from that shown in FIG. 2 and is programmed to provide indicators of topics under discussion, such as "HEALTH," "MILITARY," (buttons 170, 174); "TAXES" (176), "ELECTIONS" (180), "SERVICES" (184), "EDUCATION" (188), "LEGISLATION" (192) and "SPECIAL" (194).

Similarly, the keys in the bottom row indicate "TOPIC" (168); "MEMBER" (172); "EVENT" (178); "MOTION" (182); "PARTY" (186); "SESSION" (190) and "REPLAY" (196). It should be understood that the picture appearing on the screen 102 will be the duplicate of one appearing in one of the smaller screen areas 104, 106, etc. None of the smaller images has been shown, in order to simplify the drawing.

The timecode is displayed at 116. In this case, however, the pad 116 is labeled "RECORD DURATION" because the video images are coming from a unit in the storage section 20 and are not live feeds.

Timeline Display

Figure 4:
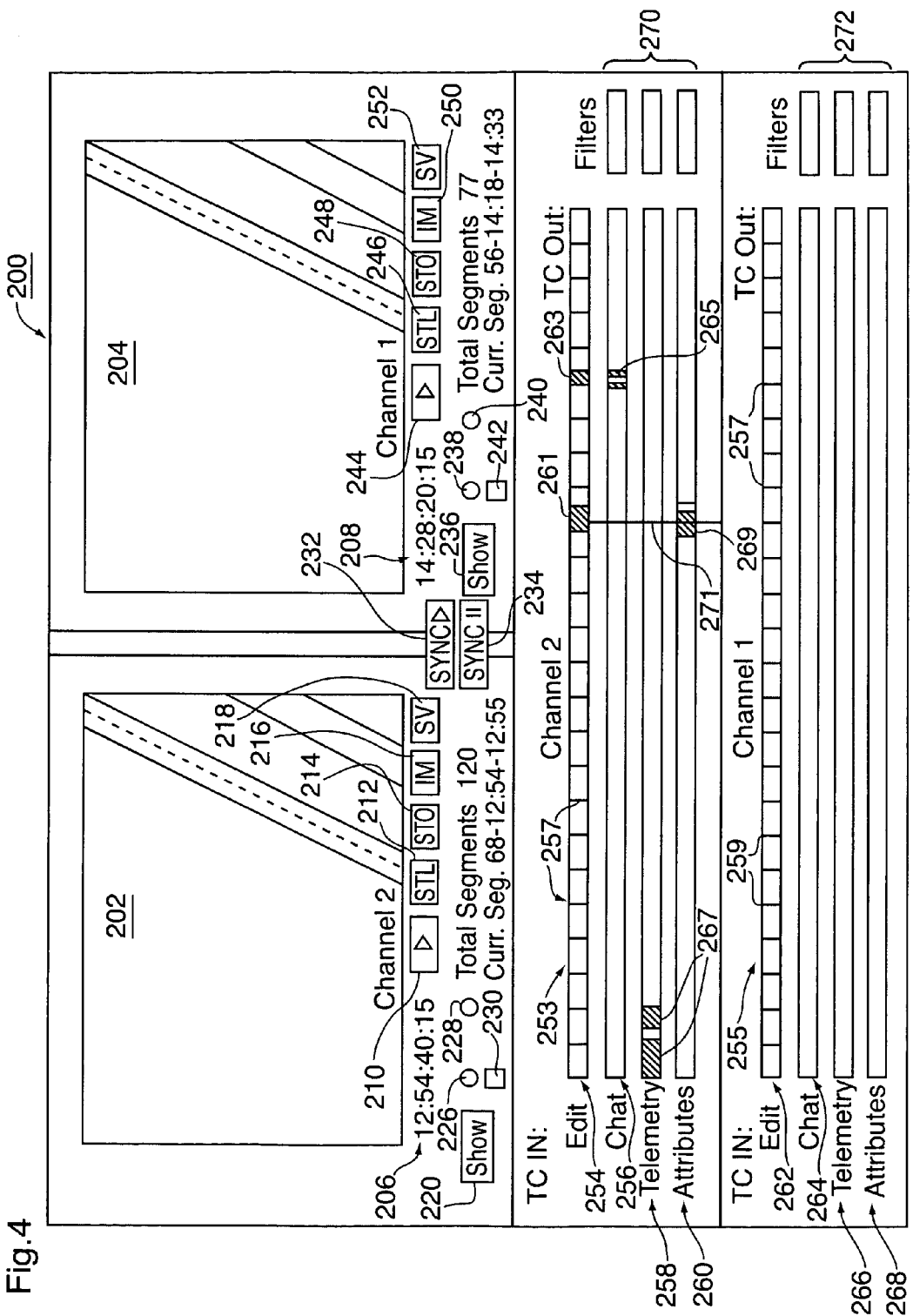
FIG. 4 shows a typical display of the timelines used to facilitate location and retrieval of specific images or image sequences from video signals.

FIG. 4 is a schematic diagram showing the display 200 of timelines used in accordance with the present invention to facilitate the rapid identification, location and retrieval of selected video record segments. Video images are displayed on two different side-by-side screens 202 and 204. Although the display screen can be a touch-screen, a hand-controlled cursor preferably is used, for purposes to be described below.

The screen 202 is labeled "CHANNEL 2" and the screen 204 "CHANNEL 1."

Two sets of timelines 253 and 255 are displayed below the screens 202 and 204. Timelines 253 correspond to images in channel 2 (screen 202), and timelines 255 correspond to those in channel 1 (screen 204).

The current timecode for channel 2 is displayed at 206, and the current timecode for channel 1 is displayed at 208.

The buttons 210 and 244 can be used to fast forward the video images. Buttons 212 and 246 can be used to start the video running at normal speed and buttons 214 and 248 can be used to stop the video.

The buttons 216 and 250 are "IMAGE" buttons which capture still images.

The buttons 218 and 252 are "SAVE" buttons which are used to store a selected segment of the video streams being viewed. Items 226, 228, 230, 236, 238, 240 and 242 are indicator lights to indicate various special functions in operation.

Lights 228 and 240 indicate that the zoom function is enabled. Lights 226 and 238 indicate that the images are being displayed in "MISSION MODE"; that is, without use of the zoom function. The zoom function expands the timelines in the segment of the EDIT line selected so as to greatly enlarge the detail of each of the timelines for ease of viewing.

Lights 230 and 242 indicate that an offset is being applied through the timeline for the purpose of matching the timecode used in forming the timelines to the original timecode.

Two synch buttons 232 and 234 are provided. Button 232 is for playing the videos on the two screens together, and button 234 is for causing the videos on the two screens to pause simultaneously.

Timelines

The two timeline groups 253 and 255 each include a top timeline marked "EDIT" 254 or 262; a second timeline 256 or 264 marked "CHAT" a third line 258 or 266 marked "TELEMETRY"; and a fourth line 260 or 268 labeled "ATTRIBUTES."

To the right of each set of timelines is a group 270 or 272 of line segments forming boxes under the heading "FILTERS." Groups 270 and 272 are used with the chat line, the telemetry line and the attributes line to search for images with specific attributes not otherwise provided for. Standard search software and routines are used.

In each of the EDIT lines 254, 262, there is a plurality of vertical lines 257 or 259 which are of uniform spacing, each indicating a time segment of the video record of a predetermined length of time. For example, each segment can be ten minutes long, or an hour long, or essentially any desired subdivision of the total program duration.

In the displays below the push buttons 210, etc. are listed the total number of segments in the timeline for the video appearing on the screen immediately above it. Below that notation is the number of the current segment being displayed on the screen. For example, beneath screen 202, the display states that there are 120 segments in the video being displayed and that the current segment is number 68, which covers the time period from 12:54 to 12:55.

The display under the screen 204 indicates that the edit line 262 has 77 segments. The spacings between the lines 257 and 259 are not necessarily to actual scale; they are simplified for the purpose of ease in illustration.

The EDIT timelines 254 and 262 are used, preferably together with a movable cursor which creates a vertical line 271 which spans all of the timelines. The cursor 271 preferably is operable by means of a mouse, trackball or similar device.

Preferably, each of the timelines uses multiple colors to indicate timeline marks 257 or 259, and special areas of interest such as 261 in the EDIT line 254, and 267 in the attributes line, which indicate the location of the cursor.

The EDIT timeline 254 or 262 can be used to advantage to quickly narrow the search for a segment known to have occurred during a particular time span. The cursor is moved to this time span in question by positioning it on the EDIT LINE 254, and then searching further by use of the attributes, telemetry, chat, or other timelines which have been displayed.

Readout Windows

FIGS. 5, 6 and 7 show samples of readout windows 274, 278 and 280. Each has a white background and a border and a pointer such as the pointer 276 pointing to the timeline position at which the information in the window is obtained. These boxes are actually displayed on the screen shown in FIG. 4, but are not shown there for the sake of clarity in the drawings.

FIG. 5 shows a window displaying information readout at the position of the cursor 271 in the ATTRIBUTES timeline 260. The window gives the timeline location; the description of the attribute; the user identification and location.

FIG. 6 shows a window 278 for information appearing in the CHAT timeline 256. The window indicates the time at which the chat occurred and the chat text which was recorded.

FIG. 7 shows a similar window 280 for the TELEMETRY timeline 258. The timecode is given, along with numbers indicating the longitude and latitude of the area under video surveillance.

It is within the scope of the invention to supply other timelines representative of other parameters of the video streams being recorded.

FIG. 8 shows a further timeline 282 which would indicate the detection of heat such as when infrared detection is used to "see" hot tank motor engines or other such heat sources at night.

Timeline 284 is one indicating the locations at which motion in a given stream of video images is detected. This is useful, for example, in surveillance of an area to determine when troop movements or vehicle movements occur.

The principles of use of the timelines shown in FIG. 8 as well as those shown in FIG. 4 are the same; that is, a cursor can be used to locate a time segment on the EDIT line to quickly find specific items of interest in the other timelines. This information can be used to create video image sequences or clips which then can be transmitted to the production equipment 24 where it can be transferred to DVD or disc, etc. Of course, if the equipment is used live at a sporting event, the clips or segments can be transmitted to broadcast equipment for selective broadcast to complement the live video being broadcast.

The system and method described above fully meet the objectives set forth above. The invention greatly facilitates the retrieval of video data and images on the basis of subject matter and other desired characteristics. This makes it relatively easy and fast to prepare video sequences of specific subjects located in a vast quantity of video images recorded over a substantial length of time.

The above description of the invention is intended to be illustrative and not limiting. Various changes or modifications in the embodiments described may occur to those skilled in the art. These can be made without departing from the spirit or scope of the invention.

The invention claimed is:

1. A video image storage and retrieval system comprising
   (a) a video logger for receiving and storing live surveillance video signal streams and having a device for electronic tagging of video images in said streams to locate by timecode video image features of interest according to predetermined criteria,
   (b) a timeline display device for receiving video images with electronic tags and displaying for said images a first timeline image representing the total duration of a program and having a plurality of timeline indicia and additional visible indicia dividing said first timeline into uniformly spaced segments, each of a variable and selectable pre-determined duration, and a plurality of further timelines, each being representative of a feature of selected ones of said video images and located by said tags, said further timelines being vertically aligned with said first timeline to display only those tagged images occurring within a selected one of said segments, and
   (c) Said tagged images of said further timelines representing a subject selected from the group consisting of telemetry, heat and motion,
   (d) a selector device including a cursor for vertical alignment with corresponding times in each of said first timeline and said further timelines to select one of said segments and selectively displaying video images from one of said further timelines in said selected segment at the location of said cursor.

2. The system as in claim 1 in which said further timeline represents chat text recorded with said video images and said timeline display device is adapted to display information including the text of the chat.

3. The system as in claim 1 in which said a timecode display device which is adapted to display the timecode of the images being displayed, and includes equipment for providing a zoom function to expand said timelines in the boundaries of said selected one of said first timeline segments.

4. The system as in claim 1 in which information is displayed for said telemetry timeline including the location coordinates of a site under surveillance.

5. The system as in claim 1 in which information is reproduced for said attributes including a description of said attributes.

6. The system as in claim 1 in which said display device includes means for producing in each further timeline indicia indicating the locations in the line of tagged images.

7. The system as in claim 1 including input encoding equipment for encoding input video signals in both MPEG 1 and MPEG 2 formats, and directing the MPEG 1-encoded signals to said logger and said timeline display devices for use in selecting video segments for further use, and further utilizing the MPEG 2-encoded images corresponding to said MPEG 1-encoded signals to produce relatively higher resolution output signals.

8. The system as in claim 1 including further display means for displaying the timecode and other data regarding said selected images in response to selection by said selector device, and for displaying the number of segments in said program and the number of said selected segment.

9. A system as in claim 8 in which said selector device is adapted to select the time duration of each of said time division segments.

* * * * *